Patented Nov. 25, 1952

2,619,506

UNITED STATES PATENT OFFICE 2,619,506

CONVERSION OF AROMATIC HYDROCARBONS TO ALDEHYDES AND ALCOHOLS

Carl Bordenca, Homewood, Ala., assignor to Sloss-Sheffield Steel & Iron Company, Birmingham, Ala., a corporation of New Jersey No Drawing. Application March 2, 1948, Serial No. 12,683

8 Claims. (Cl. 260—598)

My invention relates to a method for converting aromatic hydrocarbons into valuable cyclic aldehydes and alcohols. More particularly, it concerns a process whereby unsubstituted aromatic hydrocarbons, such as benzene and naphthalene, and alkyl substitution products thereof are converted to saturated, cyclic compounds bearing a —CHO or —CH$_2$OH group attached to the ring.

I have found that the foregoing conversion may be effected by reacting such aromatic hydrocarbons and their alkyl substitution products with hydrogen and carbon monoxide under pressure at elevated temperatures in the presence of certain catalysts. In this manner it is possible to obtain valuable cyclic aldehydes and alcohols directly from quite inexpensive initial materials. In my process the aromatic nucleus of the hydrocarbon takes on hydrogen and at least one —CHO or —CH$_2$OH group.

Aliphatic and cyclic olefines have heretofore been reacted with carbon monoxide and hydrogen under pressure in the presence of hydrogenating catalysts to produce various oxygenated compounds. However it was not considered possible to apply such a reaction to aromatic hydrocarbons, in view of the well-known stability of the double bonds in the aromatic nuclei. I have discovered that, nevertheless, one can succeed by the proper selection of catalysts and reaction conditions in bringing about a reaction between hydrogen, carbon monoxide and an aromatic hydrocarbon, whereby a double bond of the aromatic nucleus is saturated by the addition of hydrogen and the —CHO or —CH$_2$OH group to adjacent carbon atoms of the ring.

The catalysts employed in my process are metals selected from the group consisting of cobalt and nickel, the former being preferred. Active forms of these catalysts, such as Raney cobalt and specially reduced forms are particularly suitable. The catalysts may be employed as such, but are preferably supported upon carriers such as kieselguhr, and promoted by the addition of activators, such as thoria. These carriers and promoters are well-known from the hydrogenation art.

The pressures of the hydrogen and carbon monoxide do not appear to be critical and may vary within wide limits. I have successfully operated my process by charging a high pressure reaction vessel containing the aromatic hydrocarbon and the catalyst with hydrogen to a partial pressure of from 150 to 1550 lbs. per square inch and with carbon monoxide to a partial pressure from 100 to 1380 lbs. per square inch at room temperature, and then heating the contents of the vessel to the reaction temperatures, thereby materially increasing the total gas pressure. As the reaction takes place there is a drop in the total pressure, so that it is frequently advisable to add further quantities of one or both gases. Completion of the reaction is readily determined, because the drop in pressure due to gas absorption then ceases. The gases may be introduced into the pressure vessel simultaneously or successively. In some cases it is advisable to initiate the reaction using hydrogen alone, and then to add the carbon monoxide as the reaction proceeds. The proportion of hydrogen to carbon monoxide varies widely, but generally speaking I prefer to use from ½ to 2 volumes of hydrogen for each volume of carbon monoxide.

The reaction proceeds best at temperatures between 150 and 300° C. I generally charge the reaction vessel at room temperature and then apply heat to bring the contents to the desired reaction temperature. Considerable fluctuation within the preferred range may take place during the reaction. At the end of the reaction, the temperature is brought down by cooling and the pressure reduced by discharging the gases. The reaction vessel may then be opened and the liquid reaction products removed. These are then separated, preferably by fractional distillation.

The reaction period will vary depending upon the aromatic hydrocarbon, catalyst and reaction conditions employed. Both aldehydes and alcohols may be produced in the reaction. It appears that lower temperatures and a short reaction period each favor the production of aldehydes, whereas higher temperatures and a longer reaction period favor alcohol production. The optimum reaction conditions for each aromatic hydrocarbon and catalyst, in order to obtain best yields of the desired product, may readily be ascertained.

My process may be illustrated by the following specific examples, but it is to be understood that my invention is not limited to the details set forth therein.

Example I 100 grams of benzene were admixed with 2 grams of a catalyst composed of freshly reduced cobalt supported upon kieselguhr, and were charged into a bomb. Carbon monoxide was then introduced up to a pressure of 700 p. s. i., whereupon hydrogen was introduced up to a total pressure of 2200 p. s. i. The temperature of the bomb and contents was then raised to 212° C., at which point the reaction began. The temperature then rose spontaneously accompanied by a steady drop in pressure. After 8 hours, a decrease in pressure was no longer apparent, and the bomb was cooled and discharged. A liquid reaction product was obtained which was then separated by fractional distillation. After boiling off a substantial amount of cyclohexane, there remained a higher boiling fraction which was identified as cyclohexane-methanol through its phenylurethane, m. p. 79° C., and by oxidation to a cyclohexane-carboxylic acid.

*Example II*

175 grams of benzene were admixed with 2 grams of a catalyst composed of freshly reduced cobalt promoted with thoria supported upon kieselguhr. The mixture was introduced into a high pressure reaction vessel and hydrogen was forced in up to a pressure of 1550 p. s. i. The vessel and contents were then heated to a temperature of 169° C. whereupon a reduction in pressure took place indicating that the reaction had begun. Carbon monoxide was then introduced to bring the total pressure up to about 2380 p. s. i. Thereafter the temperature was slightly increased and at 230° C. a further reduction in pressure took place indicating that the reaction was continued. Carbon monoxide was then again added and the temperature brought to about 260° C. Further additions of carbon monoxide were made as the pressure dropped over a period of four hours, the temperature being maintained at about 260° C. At the end of this period, no further gas absorption (reduction of pressure) was apparent.

The reaction vessel and contents were cooled and the gases permitted to escape. The remaining liquid reaction product gave a positive Schiff test indicating the presence of aldehyde. When subjected to fractional distillation, it yielded cyclohexane and a higher boiling fraction that was identified as hexahydrobenzaldehyde through formation of its semi-carbazone, M. P. 170° C., and through oxidation with alkaline permanganate to cyclohexane-carboxylic acid.

*Example III*

100 grams of toluene were admixed with a standard cobalt-thoria-on-kieselguhr catalyst and placed in a autoclave. Hydrogen was then introduced up to a pressure of 1440 p. s. i., and the reaction mixture was heated to 225° C. The pressure at this point grew to 2400 p. s. i., whereupon carbon monoxide was introduced up to a total pressure of 2520 p. s. i. The temperature rose spontaneously to 240° C. and the pressure dropped to 2400 p. s. i. The carbon monoxide was then again introduced up to a pressure of 2520 p. s. i., whereupon the temperature rose spontaneously to 258° C. The pressure again dropped to 2400 p. s. i. The step by step addition of carbon monoxide was continued in this manner, until no further reaction was apparent.

When the autoclave had cooled to room temperature, the gas pressure was released and the liquid reaction products were drawn off. The mixture was subjected to fractional distillation and yielded methylcyclohexane as well as a higher boiling fraction having an odor resembling octyl alcohol. This higher boiling fraction was then identified as being composed primarily of p-methyl-cyclohexane-methanol by oxidizing it to p-methyl-cyclohexane-carboxylic acid, and converting the latter to the amide which melted at 195° C.

In place of the benzene and toluene converted according to the foregoing examples, I may, of course, treat other unsubstituted aromatic hydrocarbons and alkylated derivatives such as xylene, naphthalene and alkylated naphthalene. The alkyl groups may be straight chain, branched chain, or cyclic. As examples I may mention ethyl, propyl, isobutyl, cyclohexyl and the like. As a practical matter, I prefer to treat aromatic compounds and alkylated derivatives that are liquid under the reaction conditions. However, compounds of high molecular weight whose melting points are higher than the preferred reaction temperature, may be dissolved in an inert, saturated solvent, and converted to cyclic aldehydes and alcohols by my process.

The preferred catalyst, as may be seen from my examples, is freshly reduced cobalt supported upon a carrier, such as kiesulguhr, and promoted with thoria. Other forms of nickel and cobalt may be employed, preferably those that are known to be highly active for hydrogenation purposes. For each catalyst and for each aromatic hydrocarbon there are optimum reaction conditions under which maximum yields of the desired products will be obtained, and these will vary somewhat depending upon whether cyclic aldehydes or cyclic alcohols are preferred. All other conditions being equal, a longer reaction period favors the production of the alcohols.

The cyclic aldehydes and alcohols obtainable by my process are useful for a variety of purposes. They may be employed as intermediates for the synthesis of other compounds, as plasticizers, solvents, perfume ingredients, etc. For the most part those I have prepared by my process are known compounds. My process represents a new, and generally far cheaper and more convenient method whereby such products may be obtained.

As many widely different embodiments of this invention may be made without departing from the spirit and scope hereof, it is to be understood that the invention is not limited to the specific embodiments hereof except as defined in the appended claims.

I claim:

1. In a process for preparing an oxygenated compound of the class consisting of cyclic aldehydes and alcohols, the step of contacting a catalyst of the class consisting of active cobalt and active nickle hydrogenation catalysts, at a temperature of from 150 to 300 degrees centigrade and a pressure of at least 250 pounds per square inch, with a mixture consisting essentially of hydrogen, carbon monoxide and an aromatic compound selected from the class consisting of unsubstituted and alkyl-substituted aromatic hydrocarbons to effect oxygenation of the aromatic compound.

2. The invention as defined by claim 1 in which the catalyst is thoria-promoted freshly reduced cobalt on kieselguhr.

3. The invention as defined by claim 1 in which the contacting is terminated when the reaction pressure, which gradually drops during the course of the reaction, stops dropping, and the oxygenated compound is then recovered from the resulting mixture.

4. The invention as defined by claim 3 in which the aromatic compound is of the benzene series.

5. The invention as defined by claim 3 in which the catalyst is an active cobalt hydrogenation catalyst.

6. A process for preparing an oxygenated compound of the class consisting of cyclic aldehydes and alcohols, which process comprises the step of contacting an active cobalt hydrogenation catalyst at a temperature of about 150 to 300 degrees centigrade and a pressure of at least about 250 pounds per square inch with a mixture consisting essentially of 1 volume of carbon monoxide, ½ to 2 volumes of hydrogen, and an aromatic compound selected from the class consisting of unsubstituted and alkyl-substituted aromatic hydrocarbons to effect oxygenation of the aromatic compound, and then recovering the oxygenated product from the resulting mixture.

7. The process as defined by claim 6 in which the catalyst is first contacted with the hydrogen and the aromatic compound until a drop in pressure takes place, and then the carbon monoxide is introduced into the mixture.

8. The process as defined by claim 7 in which the carbon monoxide is introduced in separate portions each of which follows a drop in the pressure of the reaction mixture.

CARL BORDENCA.

REFERENCES CITED

The following references are of record in the file of this patent:

UNITED STATES PATENTS

| Number | Name | Date |
|---|---|---|
| 1,467,905 | Midgley | Sept. 11, 1923 |
| 2,327,066 | Roelen | Aug. 17, 1943 |
| 2,437,600 | Gresham | Mar. 9, 1948 |
| 2,517,383 | Brooks | Aug. 1, 1950 |

OTHER REFERENCES

B. I. O. S. Final Report 447, Interrogation of Dr. Otto Roelen, July 18, 1947, page 46.